United States Patent [19]

Owczarek

[11] Patent Number: 4,720,239
[45] Date of Patent: Jan. 19, 1988

[54] STATOR BLADES OF TURBOMACHINES

[76] Inventor: Jerzy A. Owczarek, 2345 Overlook Dr., Bethlehem, Pa. 18017

[21] Appl. No.: 658,080

[22] Filed: Oct. 9, 1984

Related U.S. Application Data

[63] Continuation of Ser. No. 436,004, Oct. 22, 1982, abandoned.

[51] Int. Cl.$^4$ ............................................. F04D 21/00
[52] U.S. Cl. ................................. 415/181; 415/119; 415/DIG. 1; 416/223 A; 416/236 R
[58] Field of Search ............... 415/119, 181, 191, 192, 415/DIG. 1; 416/223 A, 228, 235, 236 R, 236 A

[56] References Cited

U.S. PATENT DOCUMENTS

| | | | |
|---|---|---|---|
| 1,135,829 | 4/1915 | MacDonald | 416/236 |
| 1,862,827 | 6/1932 | Parsons et al. | 416/236 |
| 3,304,056 | 2/1967 | Akio Sohma | 416/236 |
| 3,423,069 | 1/1969 | Chandley | 416/236 |
| 3,463,418 | 8/1969 | Miksch | 416/236 |
| 4,108,573 | 8/1978 | Wagner | 416/236 A |

FOREIGN PATENT DOCUMENTS 840543  7/1960  United Kingdom ................ 416/236

Primary Examiner—Robert E. Garrett
Assistant Examiner—John Kwon
Attorney, Agent, or Firm—Ratner & Prestia

[57] ABSTRACT

In turbomachine apparatus having alternating rows of stator blades and rotor blades, there is provided discontinuities or nonuniformities on the downstream facing surfaces of at least one row of stator blades, the nonuniformities being adapted to disperse pressure waves reflected from downstream rotor blades. The nonuniformities may be an arrangement of grooves, ridges, or a combination of grooves and ridges on the downstream facing blade surfaces; other surface discontinuity configurations are also possible, such as an arrangement of potruding surface elements or dimples, or force-absorbing material selectively deposited on the downstream-facing portion of the blade surfaces.

9 Claims, 9 Drawing Figures

STATOR BLADES OF TURBOMACHINES

This application is a continuation, Ser. No. 436,004, filed 10/22/82, now abandoned.

BACKGROUND OF THE INVENTION

This invention relates generally to turbomachines, i.e., turbines, compressors, and similarly bladed fluid flow machines, and more specifically to turbomachine blading.

It is known that the blades of turbomachines are exposed to unsteady flows which produce complex pressure fluctuations or waves of variable intensity. One form of unsteady flow in turbomachines has been described by this inventor in A.S.M.E. Paper No. 66-GT-99, "On a Wave Phenomenon in Turbines," presented at the A.S.M.E. Gas Turbine Conference and Products Show, Zurich, Switzerland, Mar. 15, 1966. This paper discloses a periodic wave phenomenon which occurs in 20 running turbine stages, i.e., two adjacent blade rows, one of which is a stationary row and one of which is a moving row. This wave phenomenon consists of concentrated pressure waves or pulses, which, when conditions are favorable, may be generated in the vicinity of the leading edges of the moving rotor blades, propagate toward the suction side of the stationary stator blades, are reflected back toward the rotor blades, collide with the moving rotor blades in the vicinity of their leading edges, and are again reflected toward the stationary stator blades. This type of unsteady flow occurs most frequently in turbomachines of conventional construction wherein the leading edges of all the blades in a row lie in the same surface of revolution and are equally spaced.

In a turbomachine stage, there may exist a number of different types of reflecting waves. Some waves may travel circumferentially with respect to the stator in the direction of rotation of the turbomachine shaft or in the opposite direction. The reflecting waves, when their number and intensity is large enough, may result in a loss in the operating efficiency of a turbomachine by producing transient or sustained separation of flow from blades in the vicinity of their trailing edges. At the natural frequency of the blades, these reflecting waves may contribute to blade failure. In addition, these waves may contribute to the generation of high intensity noise which is a particularly aggravating. problem in aircraft jet engines.

In order to decrease blade vibration problems and excessive noise generation in turbomachines, selective ratios of the number of stator blades to the number of rotor blades have been studied. While having some merit, such selective ratios have not been able to reduce to acceptable level the reflecting pressure waves. Even if the reflecting waves do not produce any resonant blade excitation at certain operating conditions, they may nevertheless cause flow separation from the blades and generate noise. Similarly, uneven distribution of stator blades along the circumference has been studied. Such uneven stator blade distribution, however, may be dangerous due to introduction of new blade excitation stimuli into the engine. Hence, it would seem that the only solution which ensures an efficient, low noise operation of a turbomachine which is substantially free of resonant blade excitation caused by reflecting waves is one which disrupts these waves without creating further blade excitation stimuli.

One turbomachine blade construction whose object is to disrupt such reflecting waves has been described by this inventor in U.S. Pat. No. 3,347,520. This construction utilizes blades, the leading edges of which are partially or entirely recessed relative to leading edges of other blades lying in the same row. By recessing the leading edges of some stator blades, the pressure waves propagating between the rotor blades and the downstream stator blades are disrupted. Similarly, by recessing the leading edges of some rotor blades, the waves propagating between the stator blades and the downstream rotor blades are disrupted.

As disclosed in U.S. Pat. No. 3,347,520, recessing the leading edges of stator blades may be accomplished with relative ease, by simply machining away a desired portion of selected blades within a row of stator blades. On the other hand, recessing the leading edges of rotor blades, which may have cooling flow passages in them or may be very thin, is much more difficult, since it may necessitate construction of two types of blades for one row: blades without the recessed leading edges and blades with the recessed leading edges.

Compressor designers have also studied other techniques of boundary layer control in axial flow turbomachinery by attempting to optimize blade shape to prevent transition to turbulent flow. One such investigation is disclosed in AGARD Conference Proceedings No. 214 in an article entitled "Secondary Flows in Axial Flow Compressors with Treated Blades" by Boyce. That publication discloses a slotted compressor blade, having a few narrow slots extending across most of the suctionside of the blade, which are said to be effective in reducing boundary layer separation. Applicant believes, however, this configuration would not be effective to disrupt reflecting pressure waves or to attenuate the noise caused by such waves, because the blade surface does not provide sufficient flow disruption. In such a design, the waves can continue to reflect from the unmodified blade surface located between neighboring slots.

It is, therefore, an object of this invention to provide an improved turbomachine component design in which the pressure waves which propagate between the stator blades and the downsteam rotor blades are disrupted without the necessity of having to design two types of blades for at least some rotor rows.

Another object of this invention is to provide an improved turbomachine stator blading construction which will improve blade reliability and machine operating efficiency.

Still another object of this invention is to provide an improved turbomachine which in operation will have a lower intensity of noise than similar machines now in use.

SUMMARY OF THE INVENTION

A turbomachine has one or more rows of spaced stator blades with stator flow passages therebetween. A rotor, which is positioned in the casing of the turbomachine for rotation about an axis, has one or more rows of spaced rotor blades with rotor flow passages therebetween. At least one of the rows of stator blades has discontinuities on the downstream facing surfaces of at least some of the blades, preferably on or toward the trailing portions thereof. These discontinuities on the blade surfaces may have various forms, such as grooves, ridges, protuberances, dimples, or perforated cover plates or elastic, force-absorbing material mounted on the blade surfaces. These discontinuities are effective in dispersing or attenuating pressure waves reflecting from the downstream rotor blades.

DESCRIPTION OF PREFERRED EMBODIMENT

Figure 1:
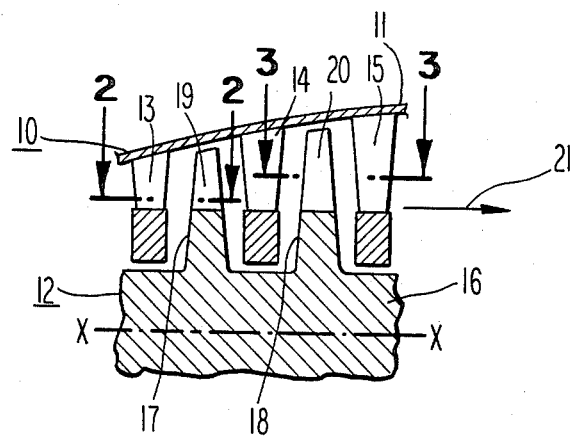
FIG. 1 is a partial diagrammatic, longitudinal sectional view through a multistage axial flow turbine.

Referring to FIG. 1, there is shown turbine 10 having outer casing 11 and rotor assembly 12. Projecting inwardly from casing 11 and attached thereto in any suitable manner are axially spaced rows 13, 14, and 15 of stator or fixed blades, with the blades in any one row equally spaced. Rotor assembly 12 comprises shaft 16, having axis X-X, and rotor wheels 17 and 18 upon which are mounted rows 19 and 20 respectively of peripherally spaced rotor or moving blades, with the blades in any one row equally spaced. Stator blading rows 13, 14, and 15 alternate with rotor blading rows 19 and 20, and the general direction of fluid flow through turbine 10 is shown by arrow 21, i.e., from left to right.

Figure 2:
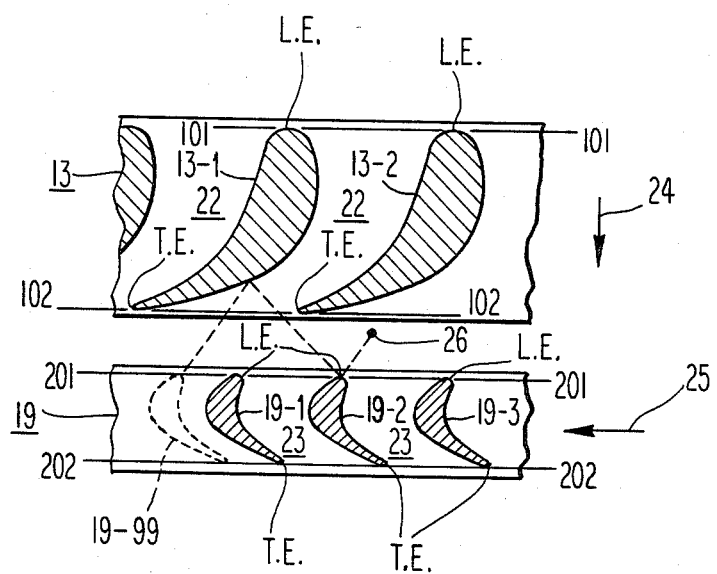
FIG. 2 is a fragmentary development of the blading of the turbine of FIG. 1, taken along line 2—2.

Turbine 10 has row 13 of stator blades and row 19 of rotor blades constructed in conventional manner. As shown in FIG. 2, stator row 13 has like blades 13-1, 13-2, etc. for as many blades as there are in the row, which are identical in height, cross section, and configuration. Blades 13-1, 13-2, etc. have their leading edges (L.E.) lying in the same surface of revolution, indicated by line 101-101, and their trailing edges (T.E.) lying in the same surface of revolution, indicated by line 102-102. Between each pair of stator blades of blading row 13 is stator flow passage 22.

In like manner, rotor row 19 has like blades 19-1, 19-2, 19-3, etc. for as many blades as there are in the row, which are identical in height, cross section, and configuration. Blades 19-1, 19-2, 19-3, etc. have their leading edges (L.E.) lying in the same surface of revolution, indicated by line 201-201, and their trailing edge (T.E.) lying in the same surface of revolution, indicated by line 202-202. Between each pair of rotor blades of blading row 19 is rotor flow passage 23.

FIG. 2 shows an example of a path which a pressure pulse may take between consecutive reflections from a rotor blading row having blading constructed in the conventional manner. Arrow 24 indicates the general direction of fluid flow, and arrow 25 shows the rotational direction of rotor blade row 19. A pressure pulse 26, shown as a dot, whose path is shown as a broken line, previously reflected from the vicinity of the leading edge of blade 19-99, when at the position shown in phantom, travels toward and strikes the suction side of stator blade 13-1 of upstream stator blading row 13. Pulse 26 is reflected back toward rotor blading row 19 and strikes rotor blade 19-2, in the vicinity of its leading edge, which blade, in turn reflects, at a later time, the same pulse 26 toward another blade of stator blading row 13. The uniformity of construction of the above-described stator and rotor blading in each row contributes to this wave reflection.

Figure 3:
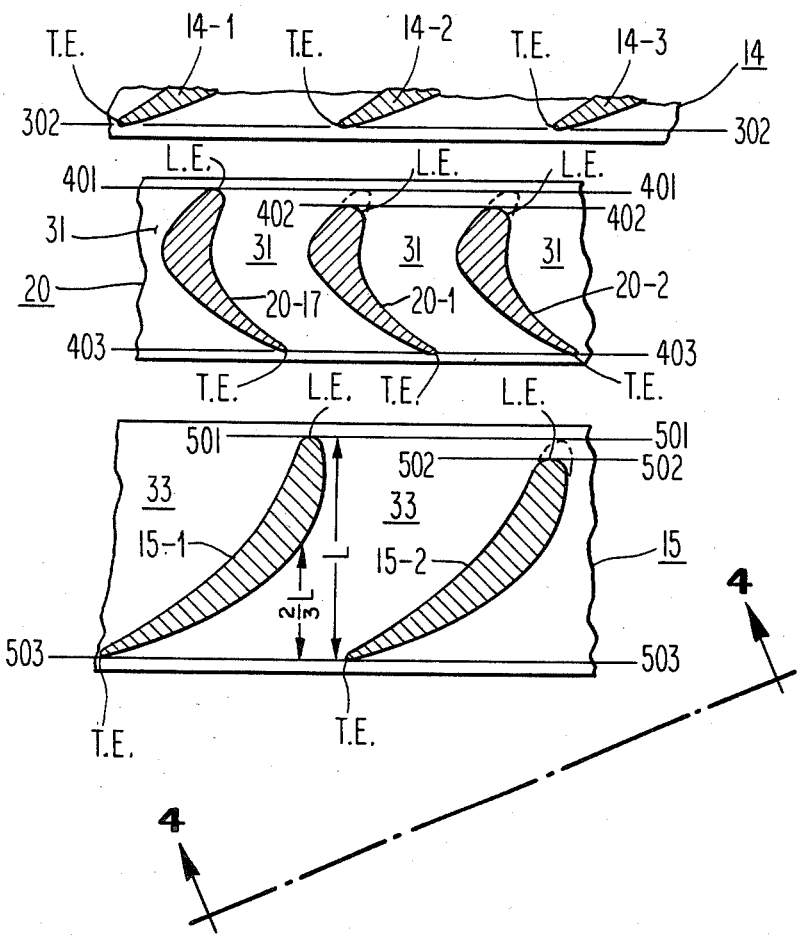
FIG. 3 is a fragmentary development of the blading of FIG. 1, taken along line 3—3.

As more fully disclosed in U.S. Pat. No. 3,347,520 and incorporated by reference herein, pressure waves or pulses of this nature may be disrupted by constructing in a turbine or in a compressor one or more rows of blading as shown in FIG. 3. There shown is stator blading row 14 having blades 14-1, 14-2, 14-3, etc., the trailing edges (T.E.) of which lie in the same surface of revolution, indicated by line 302-302. Adjacent downstream rotor blading row 20 comprises blades having two different widths: nonrecessed blades and recessed blades. The nonrecessed blades, one of which is blade 20-17, have their leading edges (L.E.) lying in the same surface of revolution, indicated by line 401-401, while recessed blades 20-1, 20-2, etc. have their leading edges (L.E.) lying in another surface of revolution, indicated by line 402-402. The trailing edges (T.E.) of all blades in rotor blading row 20, however, lie in the same surface of revolution, indicated by line 403-403.

Recessed blades may also be provided in a row of stator blading, as for example in stator blading row 15 adjacent to and downstream of rotor blading row 20. As shown in FIG. 3, stator blading row 15 comprises blades 15-1, 15-2, etc. having their trailing edges (T.E.) lying in the same surface of revolution, indicated by line 503-503. Nonrecessed blade 15-1 and other nonrecessed blades (not shown) within stator blading row 15 have their leading edges (L.E.) lying in the same surface of revolution, indicated by line 501-501; while recessed blade 15-2 and other recessed blades (not shown) have their leading edges (L.E.) lying in another surface of revolution, indicated by line 502-502.

In contrast to the foregoing and in accordance with the present invention, pressure pulses or waves may also be disrupted and their harmful effects may be decreased by constructing in a turbine or in a compressor one or more rows of stator blades having discontinuities or nonuniformities on the downstream facing surfaces of at least some of their blades.

Such discontinuities or nonuniformities may take on various forms, as will be explained in detail later. In this construction, at least one row of stator blading comprises blades of conventional design, whose surfaces are continuous and uniform, and other blades whose downstream facing surface, particularly the trailing portions thereof, have discontinuities or nonuniformities. It will be understood that the nonuniform or discontinuous blades may be placed singly or in groups of two or more blades to a group, between the conventional blades or in a combination of such arrangements.

By constructing the nonuniformities or discontinuities on the downstream facing blade surfaces, the stator blades are effective in disrupting pulses or pressure waves reflected from the downstream rotor blades. Furthermore, by constructing some stator blades with their leading edges recessed (in accordance with the teaching of above-referenced U.S. Pat. No. 3,347,520), the stator blades are also effective in disrupting the waves or pressure pulses reflected from the upstream rotor blades. For purposes of this invention, the trailing portion of each of these blades is considered to be that portion of the blade, as shown in FIG. 3, from the trailing edge (T.E.) upstream a distance equal to two-thirds the length L of the nonrecessed blade in such row.

Figure 4:
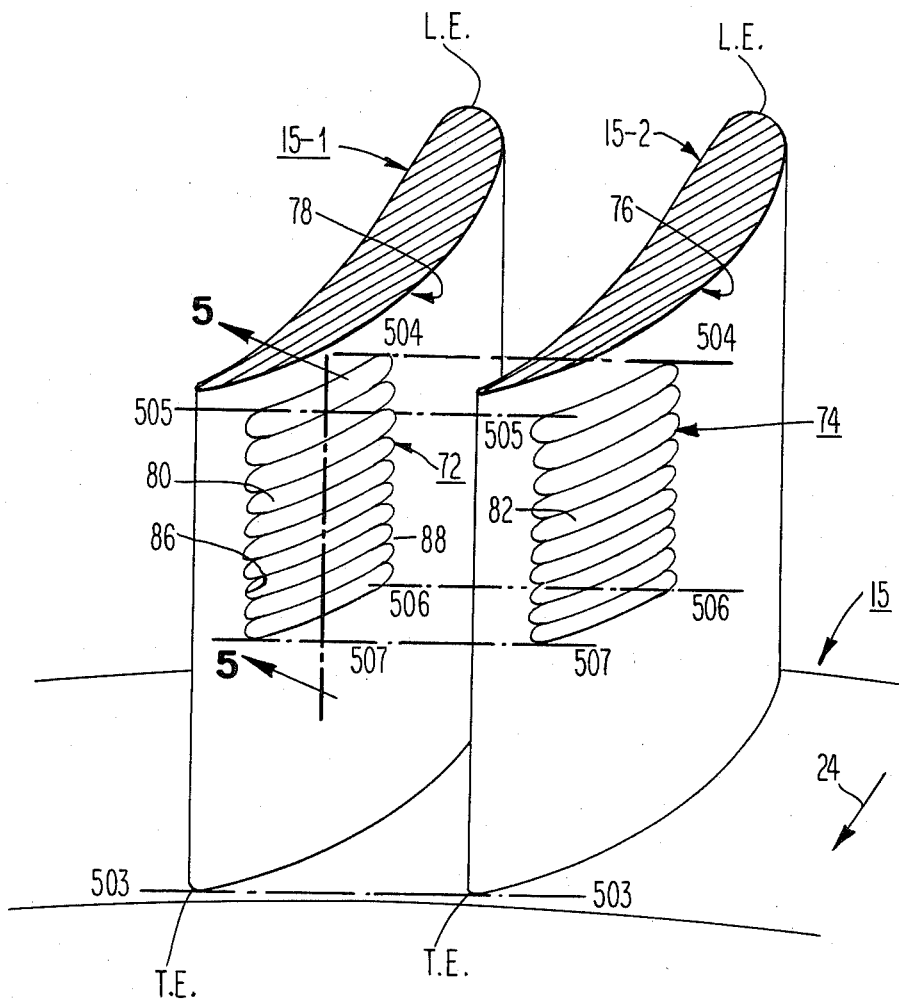
FIG. 4 is a perspective view of the blading of FIG. 3, taken in the direction shown by line 4—4, showing stator blading construction according to one embodiment of this invention.
Figure 5:
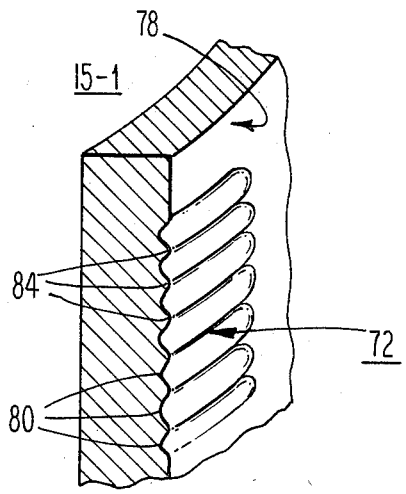
FIG. 5 is a fragmentary, perspective view of the blading of FIG. 4, taken along line 5—5, showing one form of stator blades which may be utilized in the blading construction of this invention.

One embodiment of the present invention is shown in FIGS. 3, 4, and 5. As shown, stator blading row 15 has discontinuities on the downstream facing surfaces of blades 15-1 and 15-2. It will be noted that stator blade 15-1 is nonrecessed and blade 15-2 is recessed. Discontinuous portions 72 and 74 are identical in all respects and are formed of a plurality of grooves 80 and 82, respectively. The grooves extend longitudinally in main flow direction 24 along the downstream surface of each stator blade starting from the same surface of revolution, indicated by lines 504-504 and 505-505, and terminating at the surface of revolution, indicated by lines 506-506 and 507-507. The grooves are also disposed laterally adjacent to each other forming a wavelike or sinusoidal-like surface boundary when examined in cross section, as shown in FIG. 5. Apices 84 of the wave-like boundary are coterminous and coplanar with the downstream surface 78 of blade 15-1, and the nadirs of the wave-like boundary form recesses or depressions within blade 15-1 resulting in grooves 80.

It will be understood that the depth of grooves 80 is small compared to the thickness of stator blade 15-1, and the periodic spacing of grooves 80 is such that at least three grooves may be formed along the height of blade 15-1. In addition, at their ends 86 and 88, grooves 80 include a gradual return to the ungrooved surface, to minimize stress concentration and flow disturbance at those points.

It will further be understood that discontinuous portion 72 of the preferred embodiment occupies 20% to 50% of the trailing portion of downstream surface 78. From the point of view of eliminating blade vibration, the most effective location of the grooves, on the downstream facing surface of the blade, is on that part of each stator blade which is farthest away from the axis of the turbomachine. The location of discontinuous portion 72 of downstream surface 78 should be entirely disposed within the blade's trailing portion, preferably starting adjacent to its trailing edge and covering its upper portion.

In any application of the invention to the embodiment described above, the longitudinal dimension, the cross-sectional shape, the locations of ends 86 and 88, the number of grooves 80, and the radial location of grooves 80 along the height of blade 15-1 would be based upon considerations of surface geometry, blade thickness, extent of the wave reflecting region on the downstream surface, and pressure gradient existing between flow passages 33 of stator blades 15. The main criterion in the groove construction would be to disrupt the reflecting pressure waves but preserve as much as possible the flow cross-sectional area which exists between neighboring blades of conventional construction.

Figure 6:
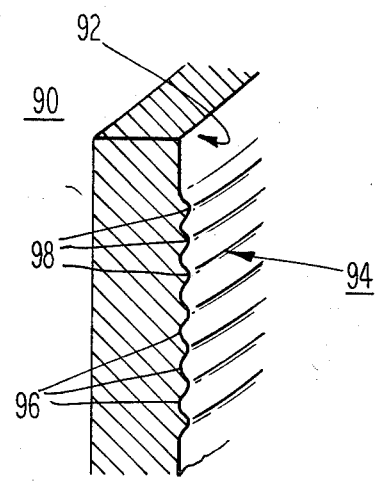
FIGS. 6, 7, and 8 are fragmentary, perspective views, similar to FIG. 5, showing various other forms of stator blades which may be utilized in the blading construction of this invention.
Figure 7:
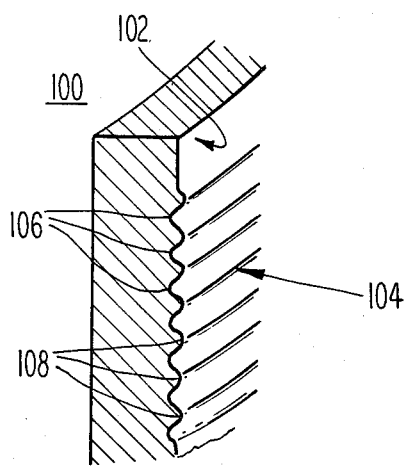
Figure 8:
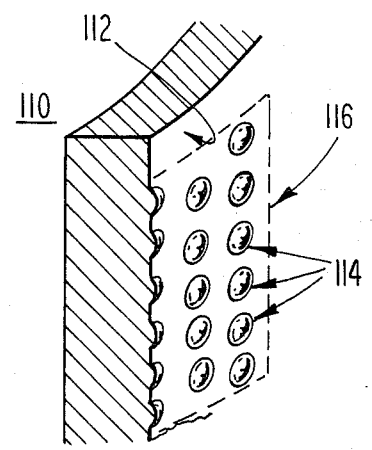

In FIGS. 6, 7, and 8, there are shown various other forms of stator blades which may be used in the blading construction of this invention. In FIG. 6, stator blade 90, which may be recessed or nonrecessed, is shown having discontinuous portion 94 on the trailing portion of downstream surface 92. Discontinuous portion 94 is comprised of a plurality of ridges 98 extending longitudinally along downstream surface 92. Ridges 98 are also disposed laterally adjacent to each other forming a wave-like or sinusoidal-like surface boundary when examined in cross section. Apices of the wave-like boundary form protrusions away from surface 92 resulting in ridges 98, and nadirs 96 of the wave-like boundary are coterminous and coplanar with downstream surface 92.

FIG. 7 shows another form of stator blade which, upon close examination, may be seen to be a hydrid construction of the blades shown in FIGS. 5 and 6. As shown, discontinuous portion 104 of downstream facing surface 102 is comprised of a combination of ridges 108 and grooves 106 which alternate laterally along the height of blade 100. Ridges 108 and grooves 106 extend longitudinally and parallel to each other along the trailing portion of downstream surface 102. Upon examining discontinuous portion 104 in cross section, a wave-like or sinusoidal-like surface boundary may be seen. The apices of the wave-like boundary form ridges 108, and the nadirs of the boundary form grooves 106.

It will be understood that discontinuous portion 94 or discontinuous portion 104 may occupy at least 20% of the trailing portion of the stator blade. As mentioned earlier, the depth of the grooves or the amount of protrusion of the ridges are small compared to the thickness of the stator blade. Moreover, the longitudinal dimension, the cross-sectional shape, and the radial location of discontinuous portions 94 and 104 along the stator blade would be based upon considerations of surface geometry, blade thickness, pressure gradient existing between the flow passages of the stator blade, and extent of the wave reflecting region on the downstream surface.

FIG. 8 shows yet another blading construction of this invention wherein discontinuous portion 116 comprises a plurality of surface elements 114 which protrude away from the trailing portion of surface 112. Elements 114 are hemispherical-like protuberances and may be aligned in a series of columns, a series of rows, or in a haphazard arrangement on the downstream surface of stator blade 110. As in the previously described embodiments, the dimensions of the discontinuities are small compared to the depth of blade 110, may be placed anywhere on the trailing portion and downstream side of blade 110, and may occupy at least 20% of the surface area of the trailing portion.

It will be understood that the stator blades within a row may be constructed from the same blade blanks or forgings and then, if the embodiment shown in FIG. 5 is desired, the grooves may be milled out from the conventional blades. If the embodiment shown in FIG. 6 is desired, the ridges may be produced by depositing additional material on the conventional blades. Finally, in order to construct the embodiment shown in FIG. 7, the grooves and ridges may be produced by first depositing additional material on the blades and then milling out the grooves from the blades.

Figure 9:
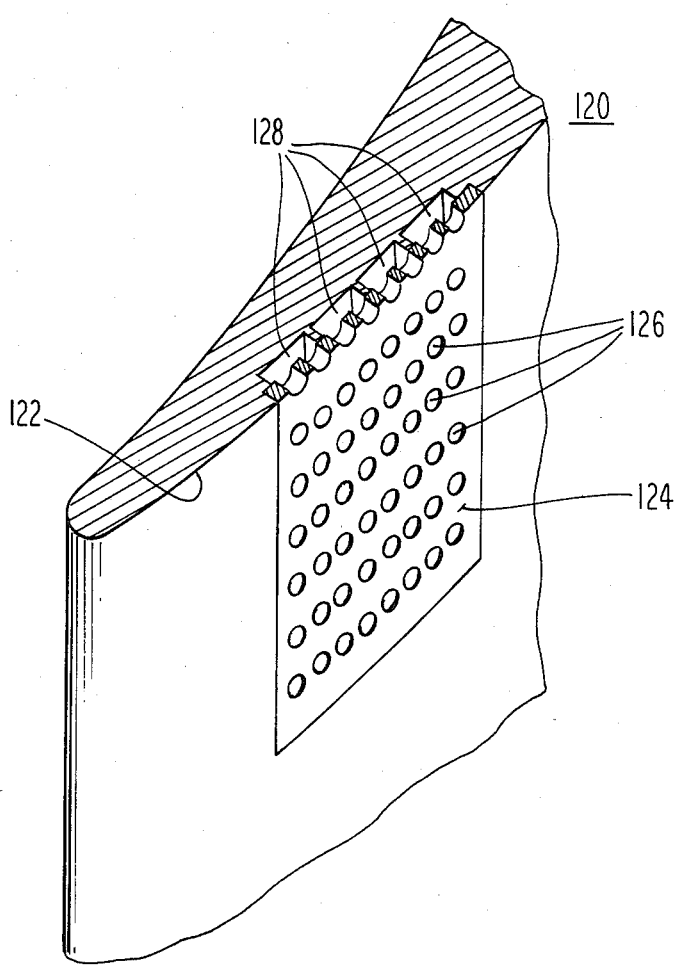
FIG. 9 is a perspective view with a horizontal cut through a blade, showing yet another form of a stator blade which may be utilized in the blading construction of this invention.

Yet another blading construction of this invention is shown in FIG. 9, wherein stator blade 120 has a thin cover plate 124 mounted on the trailing portion of downstream surface 122. Between cover plate 124 and stator blade 120 are disposed a plurality of vertical passages spanning across a portion of the height of blade 120 and entirely transversing cover plate 124. Passages 128, it will be understood, are formed by milling out vertical grooves or recesses in the downstream surface of blade 120 and then covering the grooves or recesses with cover plate 124, which may be mounted thereon in any conventional manner. As previously described for the other embodiments of this invention, cover plate 124 may occupy at least 20% of the trailing portion of downstream surface 122 and may be placed anywhere thereon, so long as it is entirely disposed on the trailing portion thereof.

Communicating between passages 128 and the downstream passage of blade 120 are a plurality of holes 126. Holes 126 may be arranged in any manner on cover plate 124, so long as a substantial number of the holes are in communication with passages 128. The size relationship between holes 126 and passages 128 is preferably such that one or two holes may be placed in communication with any transverse portion of a passage 128. Again, as before, the main criterion for the selection of the hole size and spacing and the number and width of the passages would be determined by the blade size, thickness and surface geometry, the flow conditions existing between the flow passages of the stator blade, and the extent of the wave reflecting region on the downstream facing surface.

It must be emphasized that any of the above blading construction may be utilized in any stator blading row regardless of whether a stator blade within that row is recessed or nonrecessed. Furthermore, in order to effectively disrupt the pressure waves or pulses reflected from the downstream rotor blading row, not all of the stator blades need have discontinuities formed on the trailing portion of their downstream surfaces, though a minimum of 5% of blades should have such discontinuities. The discontinuous blades may be placed singly or in groups of two or more blades to a group, between the conventional blades or in a combination of such arrangements.

Still other blading construction may be utilized. For example, soft, elastic materials, such as rubber (RTV), etc., deposited selectively on the downstream-facing portion of the stator blade surfaces, may be utilized to disperse and partially absorb the impact of the pressure waves. Such materials may be bonded, in a conventional manner, to the downstream facing surfaces of the stator blades.

While this invention has been described in detail as embodied in a turbine, it is not intended to limit the invention to turbines or the specific forms described. Rather, the invention is intended to cover all turbomachines in general, i.e., turbines, compressors, and similarly bladed fluid flow machines falling within the spirit and scope of the invention as expressed in the appended claims.

I claim:

1. In combination in a turbomachine, a casing, at least one row of spaced stator blades, with stator flow passages therebetween, mounted therein and extending inwardly therefrom, a rotor positioned in said casing for rotation about an axis and having mounted thereon at least one row of spaced rotor blades, with rotor flow passages therebetween, at least one of said rows of stator blades having blade surfaces facing downstream toward one row of said rotor blades, at least some of said downstream facing surfaces having discontinuity groove means positioned adjacent one another and disposed on at least 5% of said blade surfaces and extending substantially at 0° to the main flow direction to points inward from the trailing edges of said stator blades for dispersing pressure waves reflecting from said one row of said rotor blades.

2. Apparatus as described in claim 1, wherein said discontinuity means are comprised of a plurality of grooves extending in the main flow direction along said trailing portions of said stator blades, said grooves disposed laterally adjacent to each other forming in cross section a wave-like surface boundary having spices coplanar with said surface area of said trailing portions of said stator blades.

3. Apparatus as described in claim 1 wherein said discontinuity means are comprised of a plurality of ridges extending in the main flow direction along said trailing portions of said stator blades, said ridges disposed laterally adjacent to each other forming in cross section a wave-like surface boundary having nadirs coplanar with said surface area of said trailing portions of said stator blades.

4. Apparatus as described in claim 1, wherein said discontinuity means are comprised of a plurality of ridges and grooves extending in the main flow direction along said trailing portions of said stator blades, said ridges and grooves disposed laterally adjacent to each other forming in cross section a wave-like surface boundary wherein said ridges form apices and said grooves form nadirs on said wave-like surface boundary.

5. Apparatus as described in claim 1, wherein at least one row of stator blades comprises first blades and second blades, said first blades having at least a portion of the leading edges thereof recessed relative to the leading edges of said second blades, whereby pressure waves reflecting in the vicinity of the leading edges of said first blades and said second blades are disrupted by the nonuniformity of the leading edges thereof.

6. Apparatus as described in claim 1, wherein at least one row of rotor blades comprises third blades and fourth blades, said third blades having at least a portion of the leading edges thereof recessed relative to the leading edges of said fourth blades, whereby pressure waves reflecting in the vicinity of the leading edges of said third blades and said fourth blades are disrupted by the nonuniformity of the leading edges thereof.

7. Apparatus as described in claim 2, wherein said discontinuity means are disposed on the trailing portions of said stator blades.

8. Apparatus as described in claim 7 or claim 1 wherein at least one row of stator blades comprises first blades and second blades said discontinuity means, said first blades having at least a portion of the leading edges thereof recessed relative to the leading edges of said second blades, whereby pressure waves reflecting in the vicinity of said leading edges of said first blades and said second blades are disrupted by the non-uniformity of the leading edges thereof.

9. In combination in a turbomachine, a casing, at least one row of spaced stator blades, with stator flow passages therebetween, mounted therein and extending inwardly therefrom, a rotor positioned in said casing for rotation about an axis and having mounted thereon at least one row of spaced rotor blades, with rotor flow passages therebetween, at least one of said rows of stator blades having blade surfaces facing downstream toward one row of said rotor blades, at least some of said downstream facing surfaces having discontinuity groove means positioned adjacent one another and disposed on at least 5% of said blade surfaces and extending substantially at 0° to the main flow direction for dispersing pressure waves reflecting from said one row of said rotor blades.

* * * * *

UNITED STATES PATENT AND TRADEMARK OFFICE
CERTIFICATE OF CORRECTION

PATENT NO. : 4,720,239
DATED : Jan. 19, 1988
INVENTOR(S) : Jerzy A. Owczarek

It is certified that error appears in the above—identified patent and that said Letters Patent is hereby corrected as shown below:

ABSTRACT, line 11: "potruding" should be --protruding--.

Column 8, line 4: "spices" should be --apices--.

Column 8, line 45 (Claim 8, line 3) after "blades" and before "said" insert --having--.

Signed and Sealed this

Twenty-third Day of August, 1988

Attest:

DONALD J. QUIGG

*Attesting Officer*  *Commissioner of Patents and Trademarks*